United States Patent [19]
Cohen et al.

[11] 4,435,040
[45] Mar. 6, 1984

[54] DOUBLE-CLAD OPTICAL FIBERGUIDE

[75] Inventors: Leonard G. Cohen; Wanda L. Mammel, both of Holmdel, N.J.

[73] Assignee: Bell Telephone Laboratories, Incorporated, Murray Hill, N.J.

[21] Appl. No.: 299,213

[22] Filed: Sep. 3, 1981

[51] Int. Cl.³ .............................................. G02B 5/172
[52] U.S. Cl. ............................... 350/96.33; 350/96.30
[58] Field of Search ............... 350/96.29, 96.30, 96.31, 350/96.33, 96.34

[56] References Cited

U.S. PATENT DOCUMENTS

| | | | |
|---|---|---|---|
| 3,966,446 | 6/1976 | Miller | 65/2 |
| 3,997,241 | 12/1976 | Nishida et al. | 350/96.33 |
| 4,135,901 | 1/1979 | Fujiwara et al. | 65/2 |
| 4,206,967 | 6/1980 | Onoda et al. | 350/96.33 |
| 4,217,027 | 8/1980 | MacChesney et al. | 350/96.30 |
| 4,372,647 | 2/1983 | Okamoto et al. | 350/96.33 |
| 4,392,715 | 7/1983 | Bonewitz et al. | 350/96.33 |

OTHER PUBLICATIONS

Kawakami et al., "Characteristics of a Doubly Clad Optical Fiber with . . . ", *IEEE J. of Qu. Electr.*, vol. QE-10, No. 12, Dec. 1974, pp. 879–887.
Gambling et al., "Zero Total Dispersion in Graded-Index Single-Mode Fibres," *Electron. Lett.*, vol. 15, No. 15, Jul. 1979, pp. 474–476.
Okamoto et al., "Dispersion Minimisation in Single-Mode Fibres . . . ",*Electron, Lett.*, vol. 15, No. 22, Oct. 1979, pp. 729–731.
Chang, "Minimum Dispersion at 1.55 μm for Single-Mode Step-Index Fibres," *Electron Lett.* vol. 15, No. 23, Nov. 1979, pp. 765–767.
Snyder, "Understanding Monomode Optical Fibers", *Proc. of IEEE*, vol. 69, No. 1, Jan. 1981, pp. 6–13.
Miya et al., "Fabrication of Low Dispersion Single-Mode Fibers . . . ", *IEEE J. of Qu. Eletr.*, vol., QE-17, No. 6, Jun. 1981, pp. 858–861.

*Primary Examiner*—John D. Lee
*Attorney, Agent, or Firm*—Richard D. Laumann; Eugen E. Pacher

[57] ABSTRACT

The invention pertains to W-profile single-mode silica-based optical fiberguide, and to communication systems employing these fiberguide. Such guides can be designed to have large bandwidth over a wide wavelength region, and, in particular, to have minimal chromatic dispersion at two different wavelengths, e.g., about 1.3 μm and about 1.55 μm, the wavelengths of loss minima in silica. Disclosed are ranges of fiber parameters that can yield these and other advantageous fiberguide characteristics. In particular, in fibers according to the invention the difference between core and outer cladding refractive index is between about 0.1% and 0.4% of the outer cladding index, the difference between the inner cladding and the outer cladding index is between about 1 times and about 3 times the difference between core and outer cladding, the core radius is between about 0.5 and 0.8 times the outer radius of the inner cladding, and the outer radius of the inner cladding is at least about 5 μm. Any suitable dopant, e.g., fluorine, germanium, boron or phosphorus, can be used. In preferred embodiments, the core is undoped $SiO_2$, or lightly Ge-doped $SiO_2$, and the two clads are fluorine-doped.

18 Claims, 13 Drawing Figures

DOUBLE-CLAD OPTICAL FIBERGUIDE

FIELD OF THE INVENTION

This invention pertains to optical fiberguide with cladding, in particular, to fiberguide having at least two concentric cladding regions, and to a communication system comprising such fiberguide.

BACKGROUND OF THE INVENTION

The low loss and dispersion of single-mode fiberguides make them attractive for optical communications systems having long repeater spacing and large bandwidth. In such systems, the maximum data transmission rate is limited by chromatic dispersion due to material and waveguide effects.

It is well known that in pure silica, as well as in doped silica such as is presently used in the manufacture of optical fiberguide, the slope of the material dispersion as a function of wavelength is positive for the wavelength range of current interest for optical communications systems, i.e., from about 0.8 $\mu$m to about 1.6 $\mu$m. Furthermore, the material dispersion is zero at about 1.3 $\mu$m. In contrast, the waveguide dispersion typically has a small negative slope for the same wavelength range in single-mode fiberguide. Thus, total chromatic dispersion, which, to a first approximation, is the algebraic sum of material dispersion and waveguide dispersion, also has a zero, albeit typically at a wavelength different from that of the material dispersion zero. See, for instance W. A. Gambling et al., *Electronics Letters*, Vol. (15), pp. 474-476, 1979. It is also well recognized that the loss spectrum of silica-based fiberguide typically has a relative minimum at about 1.3 $\mu$m, and an absolute minimum (for the wavelength regime of interest here) at about 1.55 $\mu$m. Calculations have shown that it is possible to design single-mode step-index fiberguide having zero chromatic dispersion at the wavelength of minimum loss. C. P. Chang, *Electronics Letters*, Vol. 15(23), pp. 765-767, 1979.

Although a single mode fiberguide in which the minimum of chromatic dispersion occurs at the wavelength of minimum loss near 1.55 $\mu$m has high bandwidth at that wavelength, such a fiberguide typically has to have a very small core, typically of less than about 5 $\mu$m diameter, and difficult splicing problems result. Furthermore, in a communication system using such fiberguide, even a very slight deviation of signal carrier wavelength from the wavelength of minimum dispersion results in substantial degradation of the system's bandwidth. For instance, a carrier deviation of ±0.05 $\mu$m from the wavelength of minimum dispersion results in a reduction of the maximum data transmission rate by almost two orders of magnitude. It is clear from this discussion that standard step-index single-mode fiberguide designed for operation at 1.3 $\mu$m is not suitable for operation near 1.55 $\mu$m, and vice versa, and similarly, that such fiberguide typically would not permit wavelength-division multiplexing.

It has recently been recognized that double-clad single-mode fiberguide, also referred to as W-profile fiberguide, has potentially substantial advantages over conventional single-clad guide. For instance, it has been pointed out that W-profile fiberguide is capable of yielding single-mode operation with a larger core than is possible in conventional single-mode step-index guide. S. Kawakami and S. Nishida, *IEEE Journal of Quantum Electronics*, QE-10(12), pp. 879-887, 1974.

More recently, it has also been realized that single-mode W-profile fiberguide can be designed to have two zeroes of the total chromatic dispersion in the relevant wavelength regime with a finite but small dispersion for the wavelength region between the two zeroes. K. Okamoto et al., *Electronics Letters*, Vol. 15(22), pp. 729-731, 1979.

However, these results were obtained for fiberguides having rather undesirable parameter values. In particular, the refractive index differences between the relevant fiber regions are quite large, of the order of 1 percent, and the core diameter is quite small, about 7 $\mu$m. Large index differences imply heavy doping, which typically results in substantial Rayleigh scattering losses, and small cores typically result in substantial splicing losses. Both of these loss mechanisms of course tend to reduce the possible repeater spacings.

Very recently, T. Miya et al., *IEEE Journal of Quantum Electronics*, Vol. QE-17(6), pp. 858-861 (1981), reported double-clad W-profile fiberguide having smaller index differences and larger core size than the fiberguide discussed by Okamoto et al. (op cit.). In particular, Miya et al. report on single-mode W-profile fiberguides with an index difference between core and outer cladding of, e.g., 0.52 percent, an index difference between outer and inner cladding of $-0.31$ percent, a core diameter of about 7-8 $\mu$m, and a thickness of the inner cladding approximately equal to the core radius. In these fibers, the core was up-doped with germania, and the inner cladding was down-doped with fluorine. Because of the multiplicity of dopants used, fabrication of such fibers is typically relatively complex. Furthermore, the relatively heavily doped core region results in relatively high Rayleigh scattering, and the doping shifts the wavelength of zero material dispersion of the core to a wavelength above 1.3 $\mu$m, typically causing the short-wavelength minimum of the chromatic dispersion also to occur at a wavelength above 1.3 $\mu$m. Because of these and other reasons, it appears desirable to find ranges of parameters that will yield fiberguide having larger cores and reduced Rayleigh scattering, and that give greater freedom in tailoring of the chromatic dispersion spectrum.

SUMMARY OF THE INVENTION

This invention pertains to silica-based single-mode optical fiberguide having at least two cladding layers, typically double-clad fiberguide, and to communication systems comprising such fiberguides. Such fiberguide comprises three concentric regions. These regions are the core region, which we define to have a first index of refraction $n_c(1+\Delta)$ and a radius $aR_1$, the first or inner cladding region, defined to have a second index of refraction $n_c(1-H\Delta)$ and an outer radius $a$, and the second or outer cladding region, defined to have a third index of refraction $n_c$ and thickness $t$. This structure can be surrounded by a further cladding region, consisting typically of pure fused $SiO_2$ derived from, e.g., the preform starting tube. However, this further cladding can usually be ignored for purposes of this invention. In addition to the above-identified regions, such fiberguide can comprise other regions, e.g., a barrier layer designed to prevent migration of OH-radicals into the core region. In W-profile fiberguide, the indices have to satisfy the requirements that the first index be larger than the third, and the third larger than the second.

Fiberguide according to the invention has a relatively large core, a first cladding of thickness typically less than the core radius, a relatively small index difference between core and outer cladding, and a relatively deep and narrow "index-well," i.e., innercladding index. In particular, such fiberguide has a radius preferably greater than about 5 μm, $R_1$ between about 0.5 and 0.8, with core radius $aR_1$ preferably at least about 4 μm, $\Delta$ between about 0.001 and about 0.004, and H between about 1 and about 3, with the preferred values being between about 0.0015 and about 0.003, and between about 1.5 and about 2.5, for $\Delta$ and H, respectively. The core radius does not exceed about 10 μm, preferably it is less than about 8 μm. The preferred inventive fiberguide thus has a larger core (greater than 4 μm vs. 3.5–4 μm), smaller core-to-outer-cladding index difference (0.1%–0.4% vs. e.g., 0.52%), typically a greater inner-cladding-to-outer-cladding index difference (0.1%–0.6% vs. e.g., 0.31%), and a narrower inner cladding ($\frac{1}{4} - 1$ times the core radius vs. about 1 times the core radius) than the fiberguide described by Miya et al (op. cit.). Parameters within the ranges according to the invention can result in fiberguide having advantageous properties, e.g., low Rayleigh scattering and low splicing loss. Furthermore, the inventive fiberguide can be easily tailored to have low dispersion over a large wavelength region, for instance, from just below 1.3 μm to about 1.55 μm, with the two wavelengths of zero chromatic dispersion being to some degree independently adjustable. This ultimately can result in communication systems having improved characteristics, e.g., high bandwidth at both low-loss wavelengths. Additional advantages of fiberguide according to the invention typically are relative simplicity of manufacture, and relatively large permissible parameter tolerances.

Fibers according to the invention can be produced from $SiO_2$-rich performs in the usual manner, and the preforms can typically be manufactured by any appropriate technique, e.g., MCVD (modified chemical vapor deposition) or VAD (vapor axial deposition). Any appropriate index-lowering or index-raising dopant, or combination of dopants, can be used. Exemplary dopants are F (fluorine), Ge (germanium), and P (phosphorus). In preferred embodiments, the core consists essentially of silica ($SiO_2$), or of lightly germania-doped silica, with both inner and outer cladding regions being F-doped to lower their refractive indices, which can result in fiberguide in which the useful range of low dispersion is extended to shorter wavelengths, e.g., below 1.3 μm.

DETAILED DESCRIPTION

Figure 1:
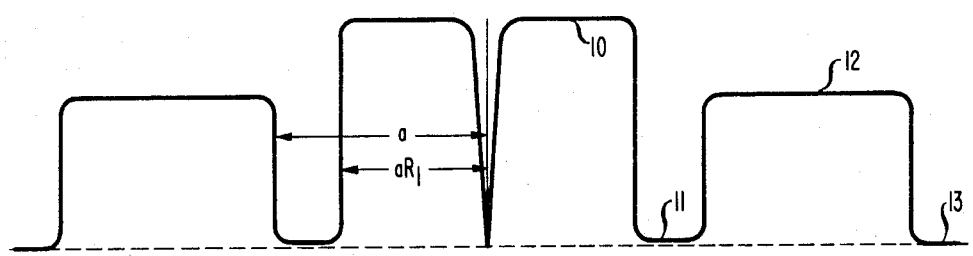
FIG. 1 schematically shows a refractive index profile for a typical "up-doped" W-profile fiberguide, such as would result from Ge-doping of silica.

FIG. 1 schematically shows the refractive index as a function of radial distance for a typical "up-doped" step-index W-profile fiberguide, such as could be produced, for instance, by Ge-doping of silica. For ease of description, the first and second refractive indices are expressed in terms of the third index, namely $n_c$, the outer-cladding index. This is done by means of the parameter $\Delta$, which expresses the degree by which the first index exceeds the third index, and the parameter H, which expresses the "depth" of the index well, i.e., the degree by which the third index exceeds the second. Also, for ease of description, the core radius is expressed in terms of a, the outer radius of the inner cladding, by means of the parameter $R_1$, which expresses the proportion of core radius to a. The inequality $0.5 < R_1 < 1$ thus implies a fiberguide in which the thickness of the inner cladding is less than the core radius.

Core region 10 has the highest refractive index of the three regions relevant to this discussion, namely core, inner cladding 11, and outer cladding 12. The core of radius $aR_1$ has refractive index $n_c(1+\Delta)$. The core refractive index is shown as having an axial dip, as is typically observed in Ge-doped fibers due to dopant burnoff during preform collapse. Fiberguides having such dip, however, typically have the intended profile over at least about 90% of the fiber cross section. For instance, in step-index fiber the core index is typically substantially constant over at least 90% of the cross section. Inner cladding 11 has the lowest refractive index among the three regions, of value $n_c(1-H\Delta)$. The thickness of the inner cladding region is $a(1-R_1)$. Outer cladding region 12 has refractive index $n_c$, intermediate in value between the refractive indices of the core and the inner cladding. The thickness of the outer cladding is not critical.

Typically, however, it should be relatively large, so that the outer cladding can be treated essentially as of infinite thickness, i.e., only a negligible fraction of the energy propagating within the fiber is not contained within regions 10, 11 and 12. This condition is fulfilled typically if the thickness of the outer cladding region is at least several times larger than the core radius, and is preferably at least about six times the core radius. Region 13 corresponds to a possible further cladding region, for instance, derived from a fused silica preform starting tube. In such a case, the refractive index of region 13 is the refractive index of undoped fused silica. Since it is assumed that region 13 has negligible effect on signal propagation within the fiberguide, the refractive index of cladding 13 can in principle be greater than, equal to, or less than that of the adjacent cladding 12.

Figure 2:
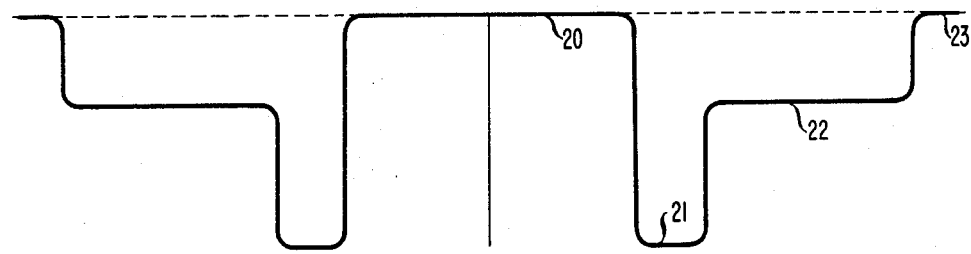
FIG. 2 similarly depicts a typical "down-doped" profile, such as would result from F-doping of silica.

FIG. 2 schematically shows the refractive index profile as a function of radial coordinate of a "down-doped" step-index W-profile fiberguide, as could, for instance, be achieved by F-doping of silica. Core region 20, inner cladding 21, outer cladding 22, and further cladding 23 are directly analogous to regions 10, 11, 12, and 13, respectively, of FIG. 1, with identical relationships between the various refractive indices, and identical notation for radial dimensions and refractive indices. The profile of FIG. 2 is applicable to F-doped fiber having a core consisting essentially of pure silica. Since, in this case, no dopant burn-off can occur during preform collapse, typically no index-dip develops. In fiberguide having relatively heavily F-doped inner and outer cladding, the thickness of the outer cladding preferably should be at least about 8 times the core radius to prevent leakage of the propagating signal mode.

It is of course also possible to practice the invention with multiple-dopant fiberguide. For instance, in a particular embodiment of the invention the core is lightly up-doped (e.g., Ge-doped), and the claddings down-doped (e.g., F-doped). Exemplary parameter values are $\Delta = 0.2\%$ (with typically only part of this due to updoping), $H=2$, $a=7$ $\mu m$, and $R_1 = 0.7$. This results in a fiber having low Rayleigh scattering due to the light doping of the core, and a wavelength of zero material dispersion close to that of pure $SiO_2$.

Although in FIGS. 1 and 2 we show essentially step-like index profiles, fibers according to the invention do typically not have to have such profiles. If a profile intentionally or unintentionally departs from a step profile, e.g., in graded-index fiberguide, then "effective" indices and radii can be defined. See, for instance, A. W. Synder, *Proceedings of the IEEE*, Vol. 69(1), pp. 6–13 (1981). For ease of exposition, we intend the terms "index of refraction," "radius," and "thickness," when applied to regions of fiberguide discussed herein, generally to refer to "effective" values. In regions having substantially constant index values, with step-like changes in index between regions, the "effective" values are identical to the "nominal" values of these quantities, that are indicated, for instance, in FIGS. 1 and 2. Thus, the latter "nominal" values can be seen as special cases of the more general "effective" ones.

FIGS. 1 and 2 do not show other possible fiberguide regions, such as, e.g., barrier layers, although the possible presence of such regions is contemplated in fiberguides according to the invention.

Figure 3:
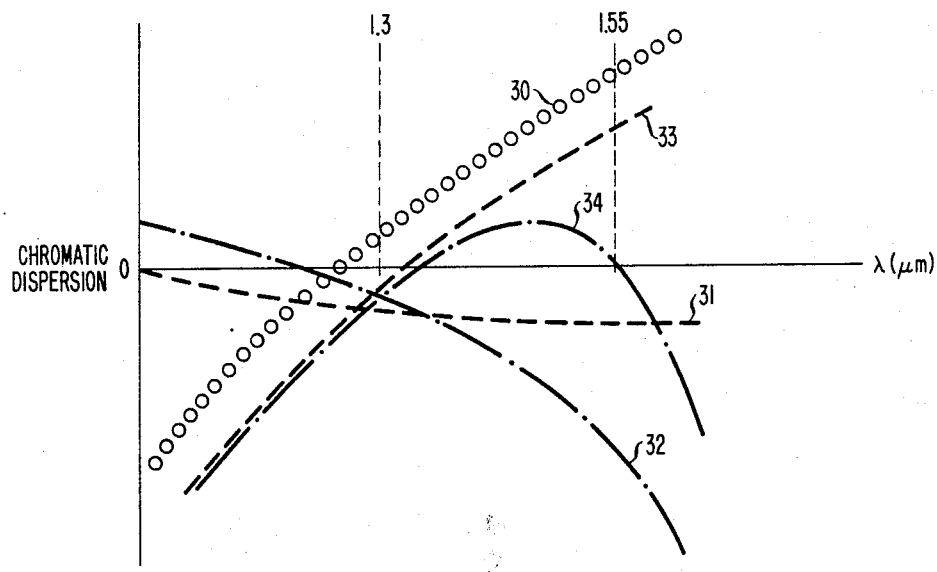
FIG. 3 is a schematic plot of chromatic dispersion vs. wavelength, and in particular shows material dispersion of typical fiberguide material, waveguide dispersion of typical single-clad and double-clad fiberguide, and their total chromatic dispersion.

In FIG. 3 we show schematically material dispersion (30), as well as waveguide dispersion for both a typical single-clad (31) and a typical double-clad (32) fiberguide as a function of wavelength. In addition, FIG. 3 also shows the sum of material dispersion and waveguide dispersion, i.e., the total chromatic dispersion, as a function of wavelength, where curve 33 represents chromatic dispersion for a typical single-clad fiber, and curve 34 that for a double-clad fiber. As can be seen from FIG. 3, single-clad guide has only one wavelength of zero chromatic dispersion, whereas double-clad guide can have two such wavelengths.

Next we illustrate the effects of changes in the parameters H and $R_1$ on the shape of the waveguide dispersion spectrum. If H is increased, with $\Delta$ constant, then the total index change between core and inner cladding becomes larger, resulting typically in increased waveguide dispersion. This can be viewed as a "clockwise rotation" of the waveguide dispersion spectrum with increasing H, and results typically in an increase in the wavelength of zero waveguide dispersion. The fact that the parameter H primarily influences the part of the waveguide dispersion curve having positive values of dispersion can be used to control the location of the shorter of the two wavelengths of zero total chromatic dispersion.

Another available control parameter is $R_1$, which typically primarily affects the curvature of the waveguide dispersion curve at long wavelengths. If $R_1$ is small, then typically the inner cladding has a pronounced effect on cutting off the lowest propagating mode. As $R_1$ increases, mode cutoff becomes more gradual and the curvature of the waveguide dispersion curve decreases. For example, the choice of $H=2$ and $R=0.7$ can yield zero total chromatic dispersion at about 1.3 $\mu m$ and at about 1.55 $\mu m$, the wavelengths at which loss minima typically occur in silica-based-fiberguide.

Figure 4:
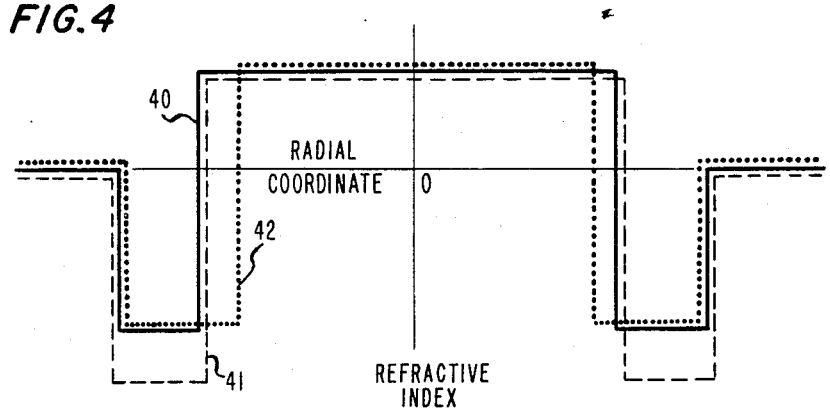
FIG. 4 shows three idealized index profiles that were used to obtain the results shown in FIG. 5.
Figure 5:
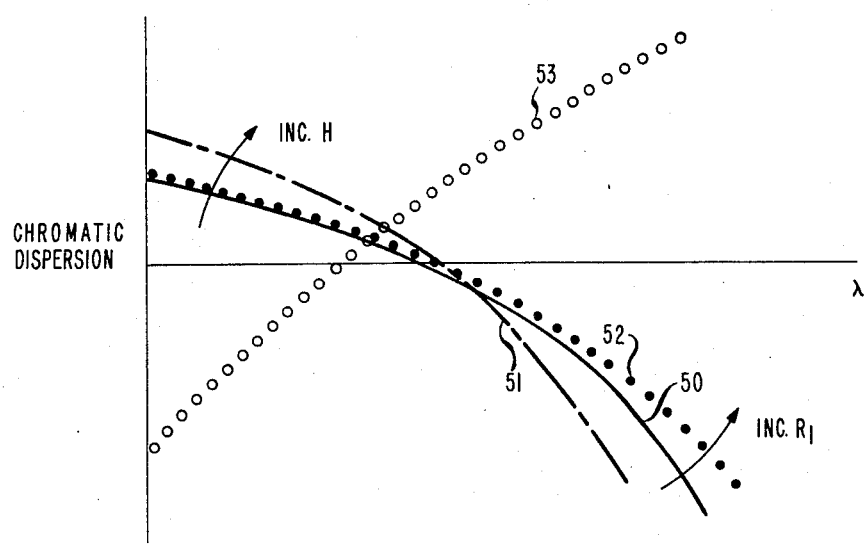
FIG. 5 is again a plot of chromatic dispersion vs. wavelength which shows the effects of varying the parameters H and $\Delta$ on fiberguide dispersion.

These effects of H and $R_1$ on dispersion are exemplified by FIGS. 4 and 5. FIG. 4 shows 3 exemplary idealized refractive index profiles, and FIG. 5 shows the waveguide dispersion curves for these three profiles, together with a typical curve of material dispersion (53). All three profiles have the same a and $\Delta$. The index profiles of FIG. 4 labelled 40 and 41 have the same $R_1$ but differ in the view of their parameter H, with 41 having H larger than that of 40. Profile 42 has the same H as profile 40, but has $R_1$ greater than that of profile 40 and 41.

FIG. 5 shows that curve 51, which uses the index profile 41 of FIG. 4, has a positive waveguide dispersion that is greater than that of curve 50, which uses the index profile 40 of FIG. 4, and a negative waveguide dispersion that is more negative than that of curve 50. Such a relationship was referred to above as a "clockwise rotation." FIG. 5 also shows that curve 51 has a slightly larger wavelength of zero waveguide dispersion than has curve 50. On the other hand curve 52, which uses index profile 42 of FIG. 4, is substantially identical to curve 50 for short wavelengths, and deviates therefrom for larger wavelengths, i.e., in the negative waveguide dispersion part of the spectrum.

Figure 6:
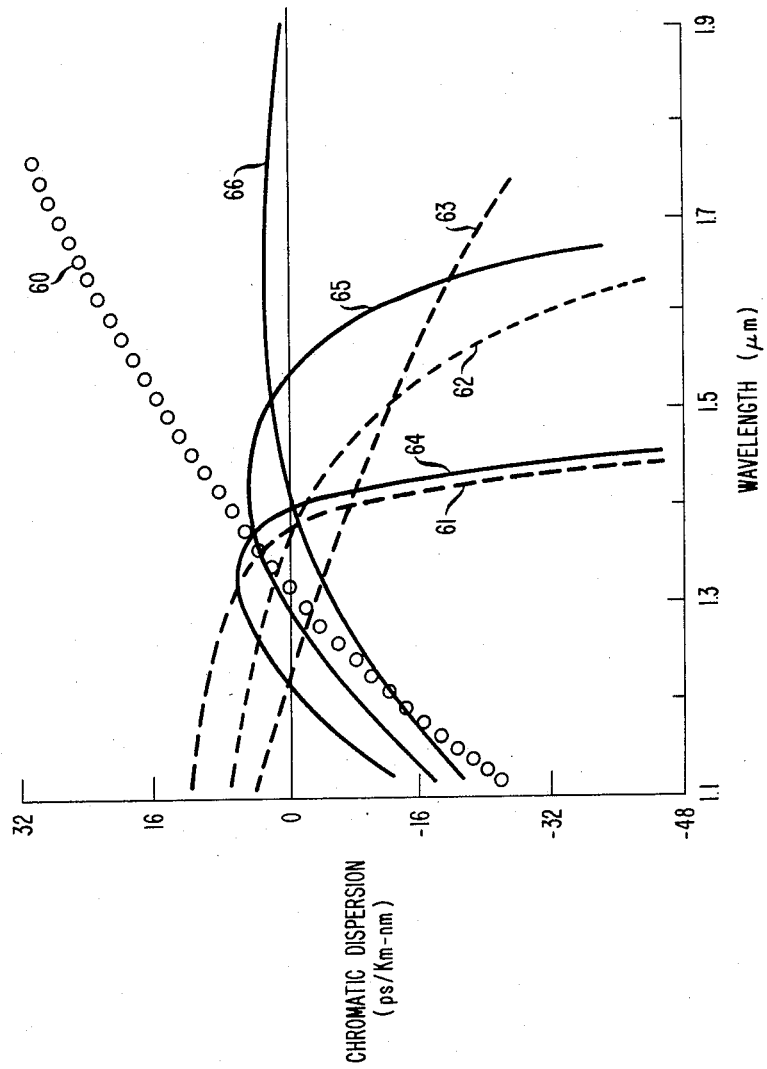
FIG. 6 also is a plot of chromatic dispersion vs. wavelength which further illustrates the effect of varying the parameter H.

FIG. 6 further illustrates the dependence of the wavelength dispersion spectrum, and consequently of the chromatic dispersion spectrum, on the value of the parameter H. Curve 60 is material dispersion, 63, 62, and 61 waveguide dispersion for $H=1$, 2, and $H>2$, respectively, and curves 66, 65, and 64 chromatic dispersion for $H=1$, 2, and $H>2$, respectively, for fiberguide having $\Delta \sim 0.2\%$ and $R_1 \sim 0.7$. The curves exemplify the utility of the parameter H for control of the zero-dispersion wavelengths.

Figure 7:
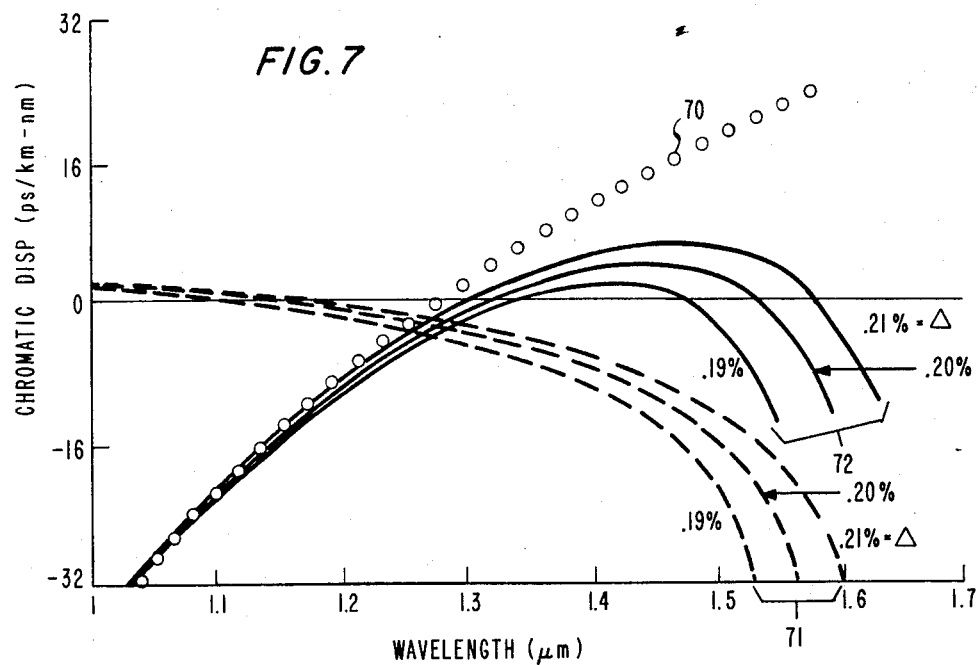
FIGS. 7 and 8 are plots of chromatic dispersion vs. wavelength for fiberguides having three different values of the doping parameter $\Delta$, for F-doped and Ge-doped fiberguide, respectively.

FIG. 7 illustrates dispersion spectra for exemplary double-clad fiberguides with pure silica core and F-doped cladding. Such fibers have advantageous properties, and are a preferred species of the invention. In particular, since most of the optical power is confined within the core, and since the core is undoped, Rayleigh scattering is typically low. Also, the absence of Ge in the core shifts the zero of material dispersion to a wavelength shorter than 1.3 $\mu m$, permitting design of fiberguide having a zero of chromatic dispersion of 1.3 $\mu m$, or even slightly below 1.3 $\mu m$. And the absence of dopant in the core typically results in a smoother index profile lacking a central dip and having greater axial uniformity. Fibers having $a=7$ $\mu m$, $R_1=0.7$, $H=2$, and Δ=0.19, 0.20, and 0.21 percent are considered in FIG. 7. Curve 70 is the material dispersion, and the family of curves 71 is the waveguide dispersion of fibers having the indicated values of Δ. The resulting total chromatic dispersion of these fibers is shown as the family of curves 72. Each chromatic dispersion curve has one zero crossing in the 1.3 μm region and another one in the 1.5 μm region. Since waveguide dispersion is reduced for decreasing Δ, the chromatic dispersion curves are displaced downwards and the two wavelengths of minimum dispersion are moved closer together for decreasing values of Δ. The two bandwidth peaks that occur at the wavelength of minimum dispersion coalesce into a single broad peak if the chromatic dispersion curve becomes tangent to the zero dispersion axis, as occurs for Δ~0.185 percent in fibers of the kind discussed here. Even lower values of Δ move the chromatic dispersion curve completely below the zero dispersion axis.

Figure 8:
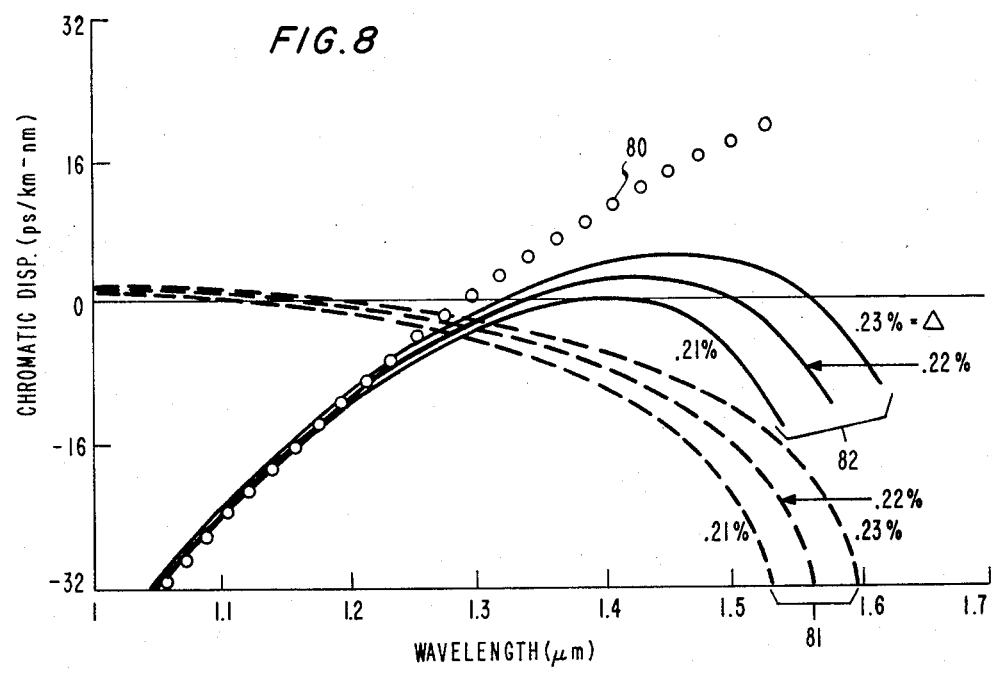

FIG. 8 shows dispersion curves similar to those of FIG. 7 for Ge-doped fiberguides with a=6.5 μm, $R_1=0.7$, H=2, and Δ=0.21, 0.22, and 0.23 percent. Curve 80 represents material dispersion, the family of curves 81 represents waveguide dispersion, and the family 82 represents the total chromatic dispersion. A value Δ=0.21 percent results in a dispersion curve that is tangent to the zero dispersion axis. Similar dispersion curves obtain for fiberguides having a lightly up-doped (e.g., Ge-doped) core and down-doped (e.g., F-doped) clads, except that the zeroes of chromatic dispersion occur at slightly shorter wavelengths. For the exemplary fibers discussed previously this shift is approximately 3%.

Figure 9:
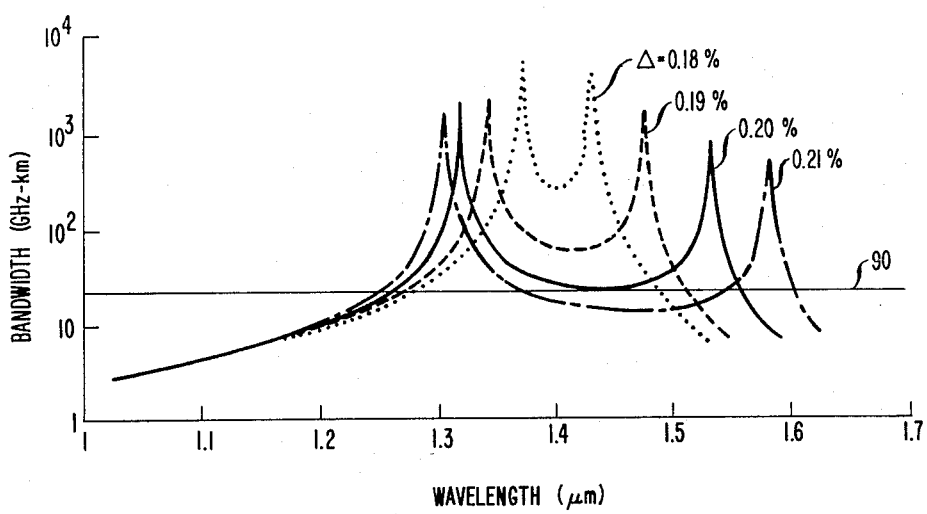
FIGS. 9 and 10 are plots of bandwidth vs. wavelength, for fiberguides having different values of $\Delta$, for F-doped and Ge-doped guide, respectively.

FIG. 9 shows bandwidth spectral curves corresponding to the dispersion spectra illustrated in FIG. 7. The bandwidths, in GHz. km, apply to laser sources with about 4 nm line width. Line 90 indicates the 25 GHz. km bandwidth level. The exemplary curves show that fibers having the parameters considered here, with Δ between 0.18 and 0.20 percent, have bandwidths greater than about 25 GHz. km at all wavelengths between about 1.3 μm and about 1.52 μm.

Figure 10:
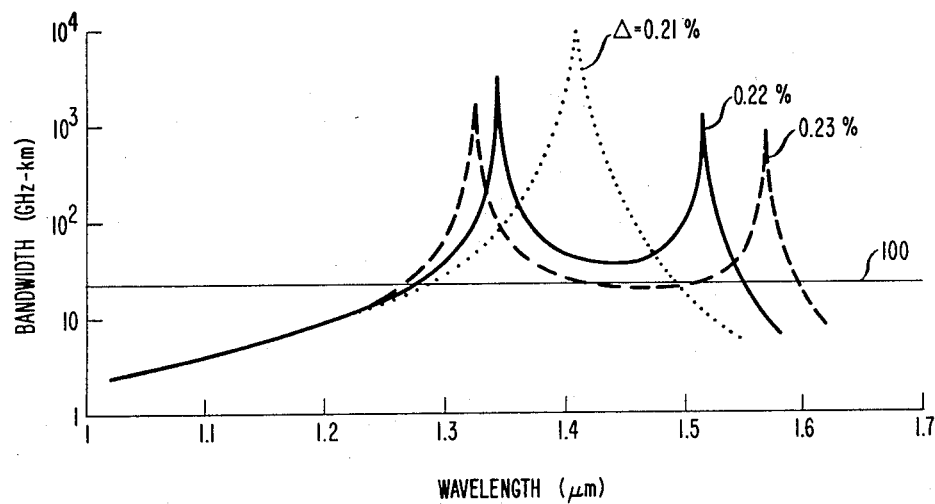

FIG. 10 shows exemplary bandwidth spectra corresponding to the dispersion spectra illustrated in FIG. 8. Curve 100 indicates the 25 GHz. km level. Again, similar spectra obtain for the fiberguides with lightly up-doped core and down-doped clads that were discussed above with the curves again shifted to slightly lower wavelengths. For instance, in the previously discussed exemplary fiber the shift is about 3%.

Fiberguide according to the invention can be manufactured by any appropriate method, e.g., MCVD or VAD. Such methods are well known to those skilled in the art (see, e.g., U.S. Pat. No. 3,966,446 issued June 29, 1976 to S. E. Miller and U.S. Pat. No. 4,135,901 issued Jan. 23, 1979 to K. Fujiwara et al and U.S. Pat. No. 4,217,027 issued Aug. 12, 1980 to J. B. Mac Chesney and P. B. O'Connor). Dopants that are useful in changing the refractive index of silica in the manufacture of optical fiberguide, e.g., fluorine, germanium, boron, and phosphorus, can be used singly or in combination in fiberguide according to the invention. Choice of the appropriate dopant will be apparent to those skilled in the art.

An important design consideration is the degree of sensitivity of fiber properties such as bandwidth to fiber parameter changes. Since fibers can be manufactured only with finite tolerances, it is clearly desirable that the limits of parameter values within which acceptable fiber results be relatively wide.

Figure 11:
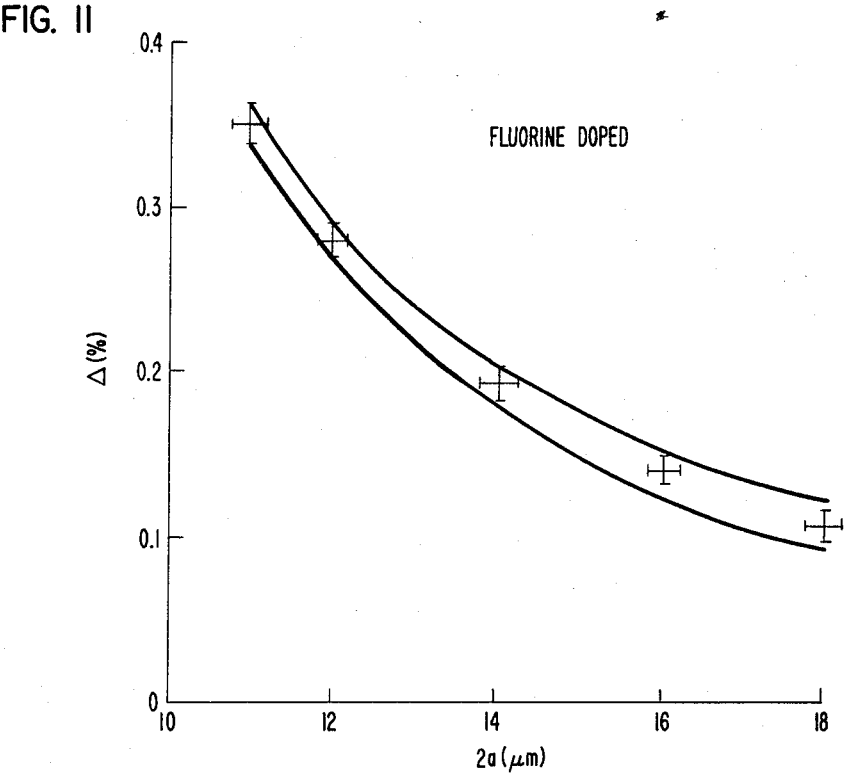
FIGS. 11 and 12 exemplify typical tolerances in the doping parameter $\Delta$ and the radius a, for F-doped and Ge-doped fiberguide, respectively.
Figure 12:
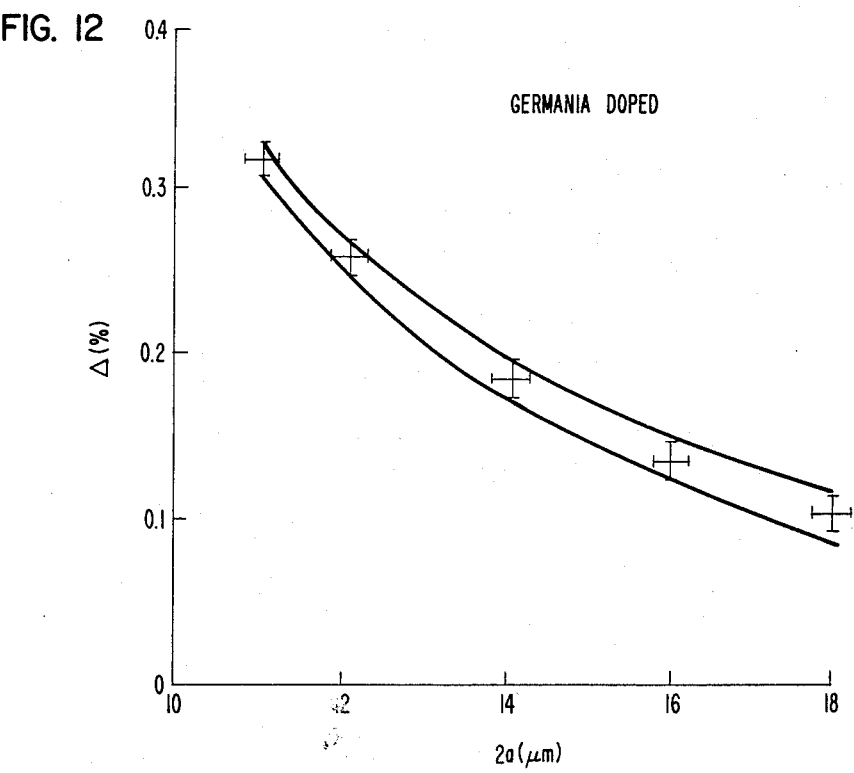
Figure 13:
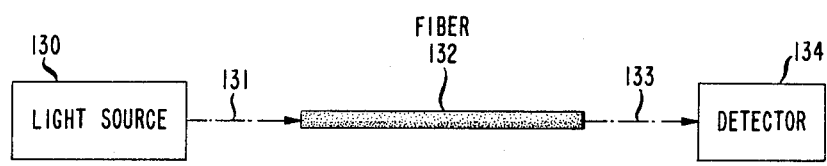
FIG. 13 schematically shows an optical communication system.

Fibers according to the invention typically are relatively insensitive to small parameter changes. This is illustrated in FIGS. 11 and 12 for F-doped and Ge-doped fibers, respectively. The figures show index difference Δ plotted as a function of the outer radius of the first cladding a, for fibers having H=2, and $R_1=0.7$. All points lying between the curves result in fiber having at least a 25 GHz.km bandwidth within the 1.3 μm to 1.55 μm wavelength region. The lower curves represent those values of Δ and a that result in a single broad bandwidth peak near λ=1.4 μm, and the upper curves represent the values that result in a 2-peak bandwidth spectrum with one peak near 1.3 μm and another peak near 1.6 μm. The crosshatched marks indicate ±0.2 μm tolerances on 2a and ±0.1 percent tolerances on Δ. We found that the area between the limiting curves as defined above becomes wider with increasing a, and thus, the tolerance requirements typically become less stringent for fiber with relatively large diameter. When incorporated into an optical communication system, fibers according to the invention can be operated with appropriate light sources and detectors in a manner that is well known to those skilled in the art. An exemplary communication system is shown schematically in FIG. 13, wherein 130 represents an appropriate "light" source, i.e., a source of optical radiation 131 at the signal carrier wavelength (e.g., between 1.3 and 1.55 μm), which, after coupling into one end of fiber 132, propagates therethrough, with radiation 133 being emitted from the other end of the fiber, and being detected by detector 134.

What is claimed is:

1. An optical communication system comprising a light source and a detector, further comprising silica-based single-mode optical fiberguide comprising
    (a) a core region having an effective radius and a first effective refractive index,
    (b) an inner cladding region concentrically surrounding the core, the inner cladding having an effective outer radius and a second effective refractive index, and
    (c) an outer cladding region concentrically surrounding the inner cladding, having an effective thickness and a third effective refractive index, CHARACTERIZED IN THAT
    (d) the difference between the first and the third index is between about 0.1% and about 0.4% of the value of the third index, with the first index being larger than the third index,
    (e) the difference between the third and the second index is between about 1 times and about 3 times the difference between the first and the third index, with the third index being larger than the second index,
    (f) the effective core radius is between about 0.5 times and about 0.8 times the effective outer radius of the inner cladding region, and
    (g) the effective outer radius of the inner cladding region is at least about 5 μm.

2. System of claim 1 wherein the refractive index of the core region is substantially constant over more than about 90% of the core cross section.

3. System of claims 1 or 2, wherein at least the inner cladding region of the fiberguide contains fluorine.

4. System of claim 3, wherein the outer cladding region of the fiberguide contains fluorine.

5. System of claim 4, wherein the core consists essentially of $SiO_2$.

6. System of claims 1 or 2, wherein at least the core region of the fiberguide contains germania.

7. System of claims 1 or 2, wherein at least one of the cladding regions of the fiberguide contains phosphorus.

8. System of claims 1 or 2, wherein the effective thickness of the outer cladding region is at least about 6 times the core radius.

9. System of claims 1 or 2, wherein the effective core radius is at least about 4 μm.

10. System of claims 1 or 2, wherein the difference between the first and the third effective index is between about 0.15% and about 0.3% of the value of the third effective index.

11. System of claim 10, wherein the difference between the third and the second effective index is between about 1.5 times and about 2.5 times the difference between the first and the third effective index.

12. System according to claims 1 or 2, wherein
(h) core region has a radius of at least about 4 μm.
(i) the inner cladding region has an outer radius greater than about 5 μm,
(j) the outer cladding region has a thickness at least about 8 times the core radius,
(k) the difference between the first and the third effective index is between about 0.15% and about 0.3% of the value of the third effective index,
(l) the difference between the third and the second effective index is between about 1.5 times and about 2.5 times the difference between the first and the third effective index,
(m) the core radius is between about 0.5 times and about 0.8 times the outer radius of the inner cladding, and
(n) the core consists essentially of $SiO_2$.

13. System of claim 12, wherein the inner and the outer cladding comprise fluorine doped silica.

14. Silica-based single-mode optical fiberguide comprising
(a) a core region having an effective radius and a first effective refractive index,
(b) an inner cladding region concentrically surrounding the core, the inner cladding having an effective outer radius and a second effective refractive index, and
(c) an outer cladding region concentrically surrounding the inner cladding having an effective thickness and a third effective refractive index,
CHARACTERIZED IN THAT
(d) the difference between the first and the third index is between about 0.1% and about 0.4% of the value of the third index, with the first index being larger than the third index,
(e) the difference between the third and the second index is between about 1 times and about 3 times the difference between the first and the third index, with the third index being larger than the second index,
(f) the effective core radius is between about 0.5 times and about 0.8 times the effective outer radius of the inner cladding, and
(g) the effective outer radius of the inner cladding is at least about 5 μm.

15. Fiberguide of claim 14 wherein the refractive index of the core region is substantially constant over more than about 90% of the core cross section.

16. Fiberguide according to claims 14 or 15, wherein
(h) the difference between the first and the third index is between about 0.15% and about 0.3% of the value of the third index,
(i) the difference between the third and the second index is between about 1.5 times and about 2.5 times the difference between the first and the third index,
(j) the core consists essentially of $SiO_2$, and
(i) the thickness of the outer cladding is at least about 8 times the core radius.

17. Fiberguide according to claim 16, wherein the inner cladding and the outer cladding comprise fluorine doped silica.

18. Fiberguide according to claim 16, wherein the core comprises germanium doped silica.

* * * * *

UNITED STATES PATENT AND TRADEMARK OFFICE
CERTIFICATE OF CORRECTION

PATENT NO. : 4,435,040

DATED : March 6, 1984

INVENTOR(S) : Leonard G. Cohen et al.

It is certified that error appears in the above-identified patent and that said Letters Patent is hereby corrected as shown below:

Column 10, line 35, "(i)" should read -- (k) --.

Signed and Sealed this

Twenty-sixth Day of March 1985

[SEAL]

Attest:

DONALD J. QUIGG

Attesting Officer     Acting Commissioner of Patents and Trademarks